(12) United States Patent
Scott

(10) Patent No.: US 7,677,849 B2
(45) Date of Patent: Mar. 16, 2010

(54) CARGO GUARD

(75) Inventor: Gary M. Scott, Milwaukie, OR (US)

(73) Assignee: Burns Bros., Inc., Lake Oswego, OR (US)

( * ) Notice: Subject to any disclaimer, the term of this patent is extended or adjusted under 35 U.S.C. 154(b) by 363 days.

(21) Appl. No.: 11/753,475

(22) Filed: May 24, 2007

(65) Prior Publication Data
US 2007/0292230 A1 Dec. 20, 2007

Related U.S. Application Data

(60) Provisional application No. 60/804,792, filed on Jun. 14, 2006.

(51) Int. Cl.
*B60P 7/08* (2006.01)
(52) U.S. Cl. .............. 410/99; 410/41; 410/155
(58) Field of Classification Search .............. 410/34, 410/35, 41, 99, 155; 206/453, 586; 248/345.1
See application file for complete search history.

(56) References Cited

U.S. PATENT DOCUMENTS

| 4,938,357 A | * | 7/1990 | Schmidt |
| 5,385,236 A | * | 1/1995 | Cowan et al. |
| 7,407,353 B2 | * | 8/2008 | George ................. 410/99 |

OTHER PUBLICATIONS

SCC Product Catalog 905C, Sep. 2005, cover page, pp. 2, 3, 21 and 41.

* cited by examiner

*Primary Examiner*—Stephen Gordon
(74) *Attorney, Agent, or Firm*—Schwabe, Williamson & Wyatt

(57) ABSTRACT

Embodiments of the present invention provide a cargo guard that is readily coupled to and/or removed from a binding strap, and further readily adapted to be repositioned with respect to the strap. The cargo guard may include one or more segments and/or one or more retainers.

2 Claims, 5 Drawing Sheets

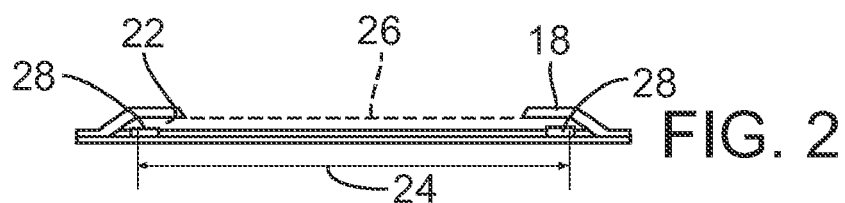
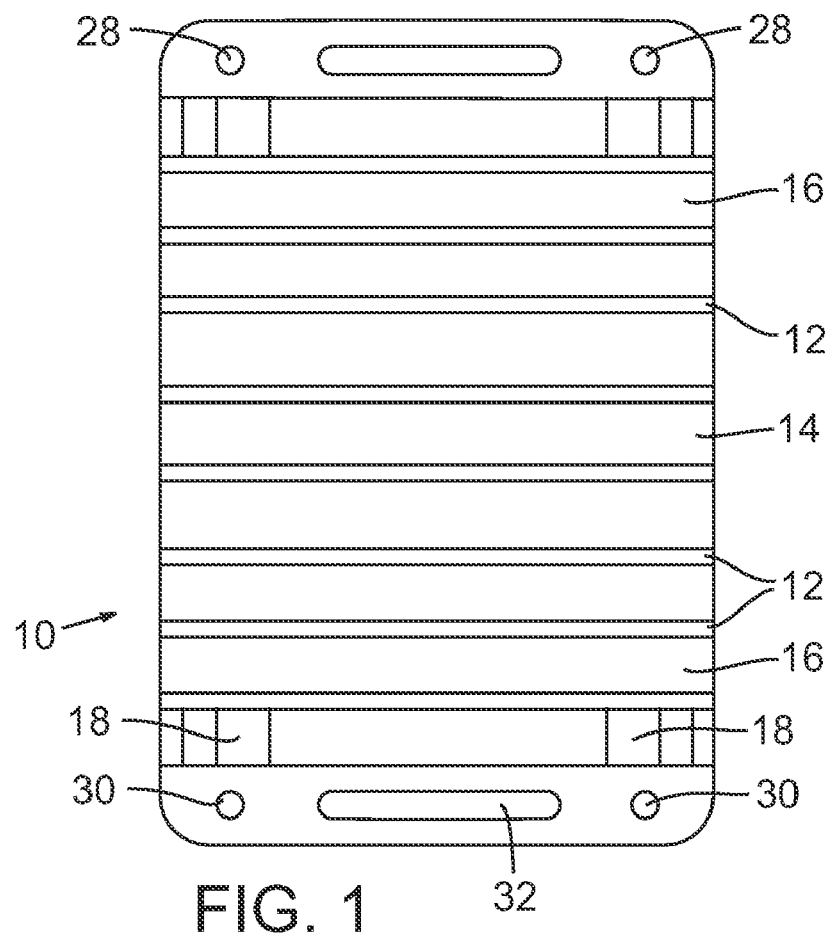
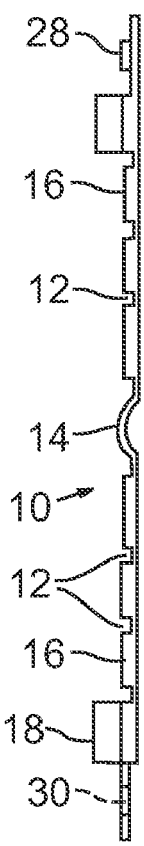

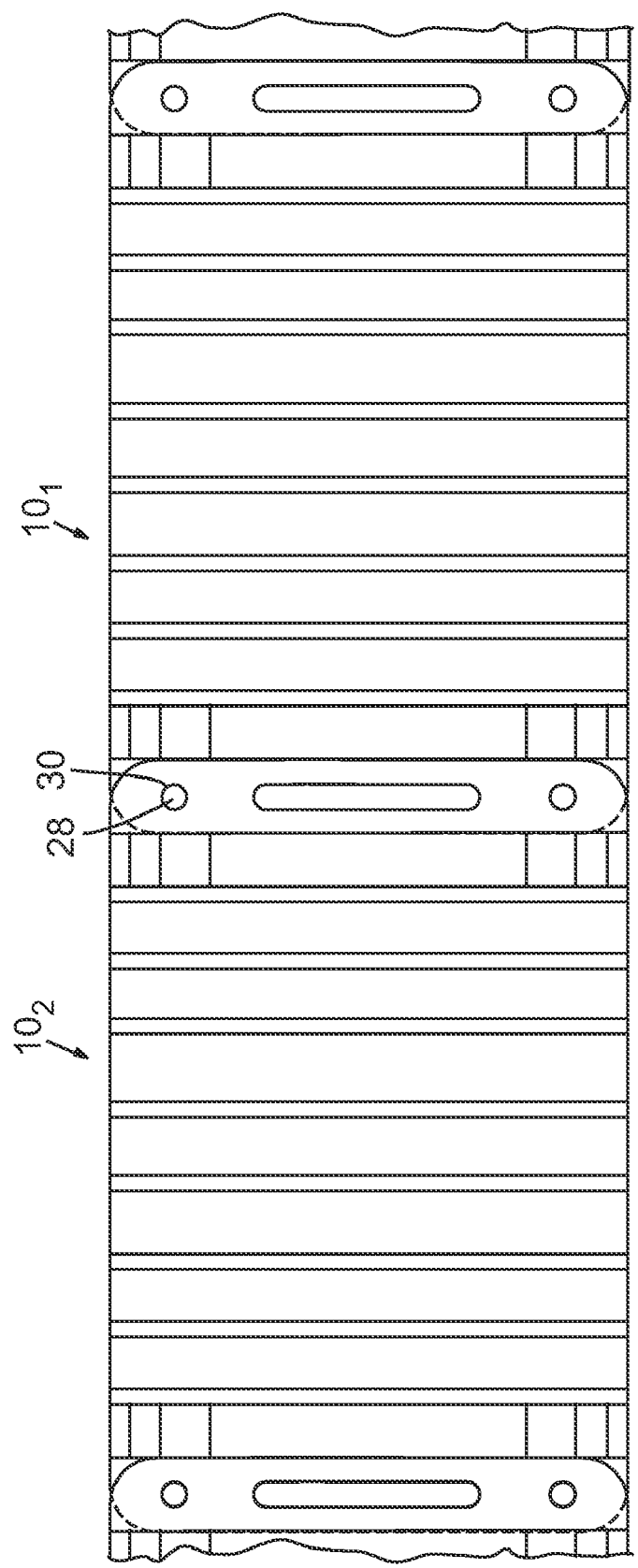
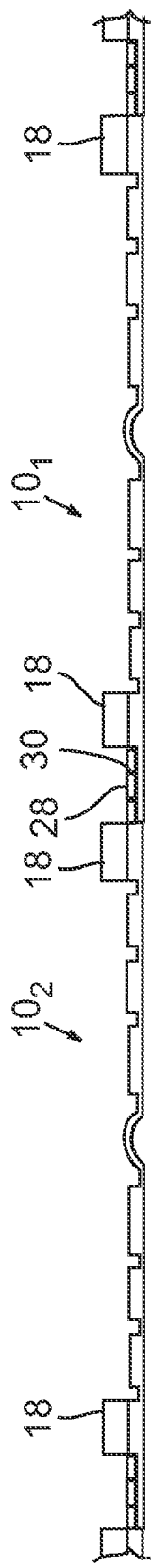

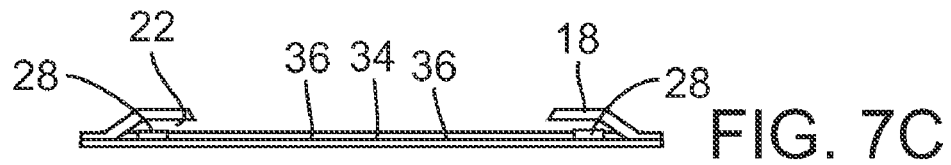
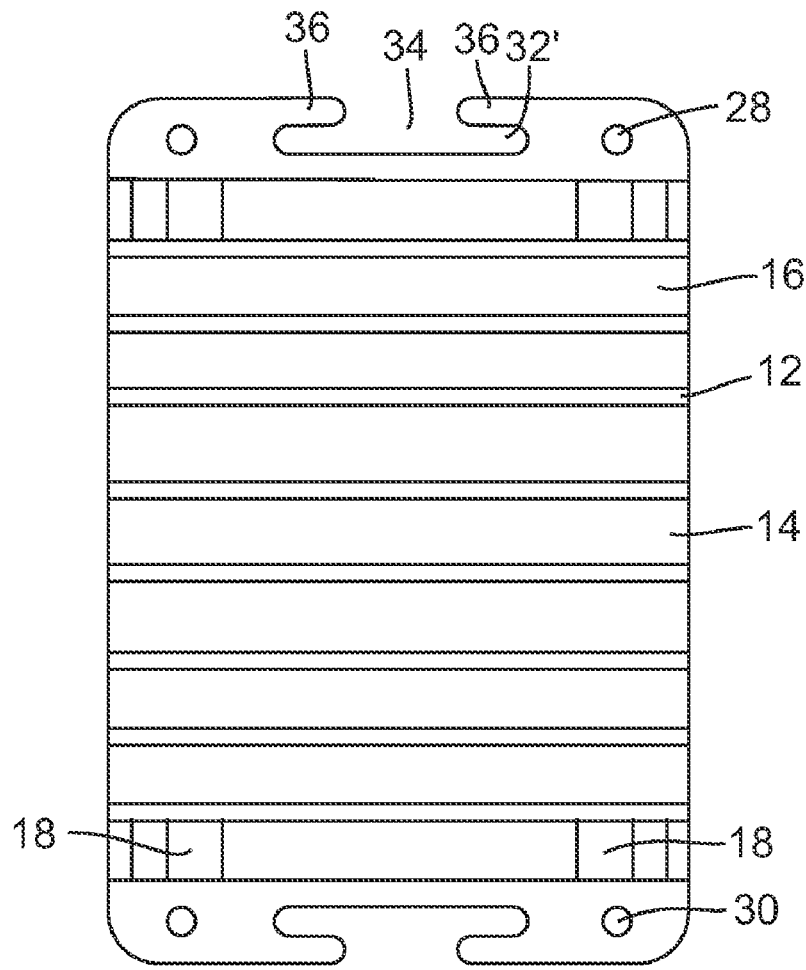
FIG. 7A    FIG. 7B

CARGO GUARD

RELATED APPLICATIONS

The present application claims priority to U.S. Provisional Application No. 60/804,792, filed Jun. 14, 2006, and titled "CARGO GUARD".

TECHNICAL FIELD

This invention relates to cargo supporting materials, and more specifically to a protective pad that underlies e.g. a binding strap that secures cargo items so as to protect such items from being marked or scarred by the strap and protects the strap from being damaged by the cargo.

BACKGROUND

It is common to haul (transport) items of all types, kinds and shapes (cargo) in cargo hauling vehicles such as trucks and railroad cars, as well as containers and other transport devices. Often, such items must be secured against shifting while being transported. A common securement system includes binding straps that are tightly wrapped around or over the items to be hauled. The straps are held by any of various clamp and/or tightening mechanisms that secures the straps to e.g. the wall or floor of the hauling vehicle.

Whereas undesired movement of the cargo is substantially prevented by such binding straps, the straps themselves can rub against the cargo items and cause undesired marking, scarring, cutting, or other damage. Whereas such marking will most commonly occur at the protruding item edges or corners, there are devices e.g. rubber pads having strap receiving slots that must be threaded onto the binding straps and located at the affected corners of the items. Alternatively there are rigid right angle or corner guards that are placed under the straps. Such prior protecting devices are problematic and there is a need for a more versatile and user-friendly protective guard.

BRIEF DESCRIPTION OF THE DRAWINGS

Embodiments of the invention are illustrated by way of example and not by way of limitation in the figures of the accompanying drawings.

FIG. 1 is a plan view of a cargo guard in accordance with embodiments of the present invention;

FIGS. 2 and 3 are end and side views respectively of a cargo guard in accordance with embodiments of the present invention;

FIGS. 4 and 5 are plan and side views respectively of multiple cargo guards in an end to end configuration in accordance with embodiments of the present invention;

FIGS. 7A-7C illustrate various views of a cargo guard in accordance with embodiments of the present invention.

DESCRIPTION OF PREFERRED EMBODIMENTS

Figure 6:
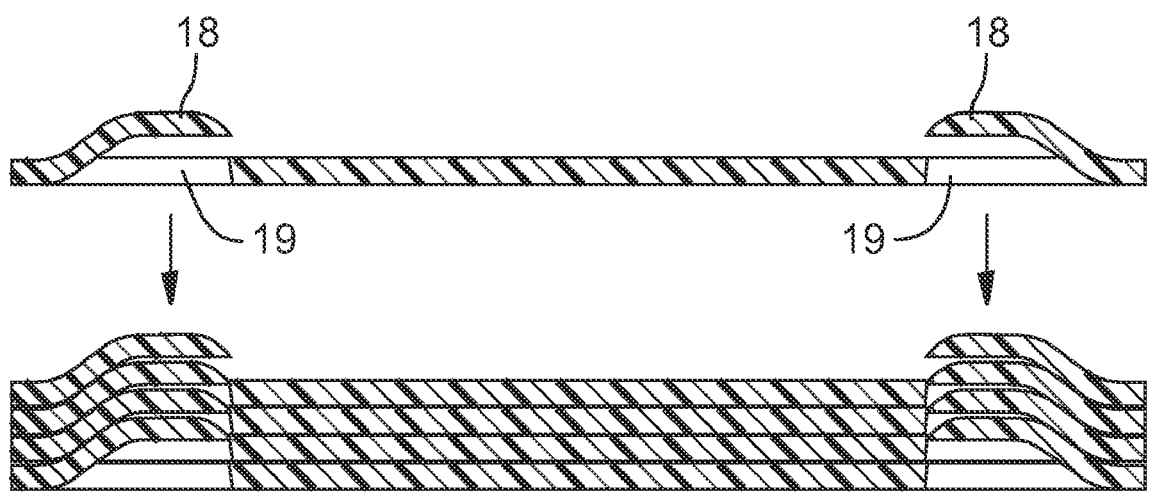
FIG. 6 is a side view of multiple cargo guards in stacked relation in accordance with embodiments of the present invention.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The description may use perspective-based descriptions such as up/down, back/front, and top/bottom. Such descriptions are merely used to facilitate the discussion and are not intended to restrict the application of embodiments of the present invention.

The phrase "in one embodiment" may be used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)," that is, A is optional.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

With reference to FIGS. 1-3, a cargo guard pad 10 in accordance with an embodiment of the present invention is illustrated. Pad 10 may be machined, molded, etc. from a number of rigid or semi rigid materials, including, but not limited to plastic materials, polyethylene, poly vinyl chloride, metal, rubber and the like. Pad 10 may include several hinge segments 12 and thicker more rigid segments 16. Segments 12 in combination with segments 16, may be cooperatively configured to allow the pad 10 to conform to the various contours of a cargo item to be protected. In one embodiment, one or more corner bend segments 14 may be included. Corner bend segments 14 may generally be enhanced or accentuated segments allowing a greater degree of bend at desired points.

The hinge segments 12 may be thinner in thickness than segments 16 so that the hinge segments 12 allow rotations of the segments 16 with respect to each other and in turn, allow the pad 10 to bend around a portion of the cargo item. In various embodiments, the hinge segments 12 may be smaller in width (distance between two adjacent segments 16) than segments 16. In various other embodiments, the segments may be larger or equal to in width of the segments 16. In various embodiments, the segment 16 may be thicker and/or wider than the hinge segments 12 to provide enhanced protection between the strap 26 and the cargo item.

The corner bend segments 14 may include a convex portion in shape to allow the pad 10 to bend around a larger sharp corner. The bend segments 14 may or may not include thinner portions similar to the hinge segments 12 on the both sides of the convex portion. The corner bend segments 14 may allow the pad 10 to bend around a corner of a variety of angles, including but not limited to approximately 90 degrees, smaller, or greater. The corner bend segments 14 may be wider than the hinge segments 12 to allow more range of bending angles, which may or may not include the convex portion. In one embodiment, the corner bend segments 14 may include other shape variations to allow the pad 10 to bend around the cargo item. For example, the corner bend segments 14 may have a profile shape that include a portion of circle, a portion of ellipse, a portion of an irregular circle, a smooth rounded curve, or a preformed angle.

Figure 8:
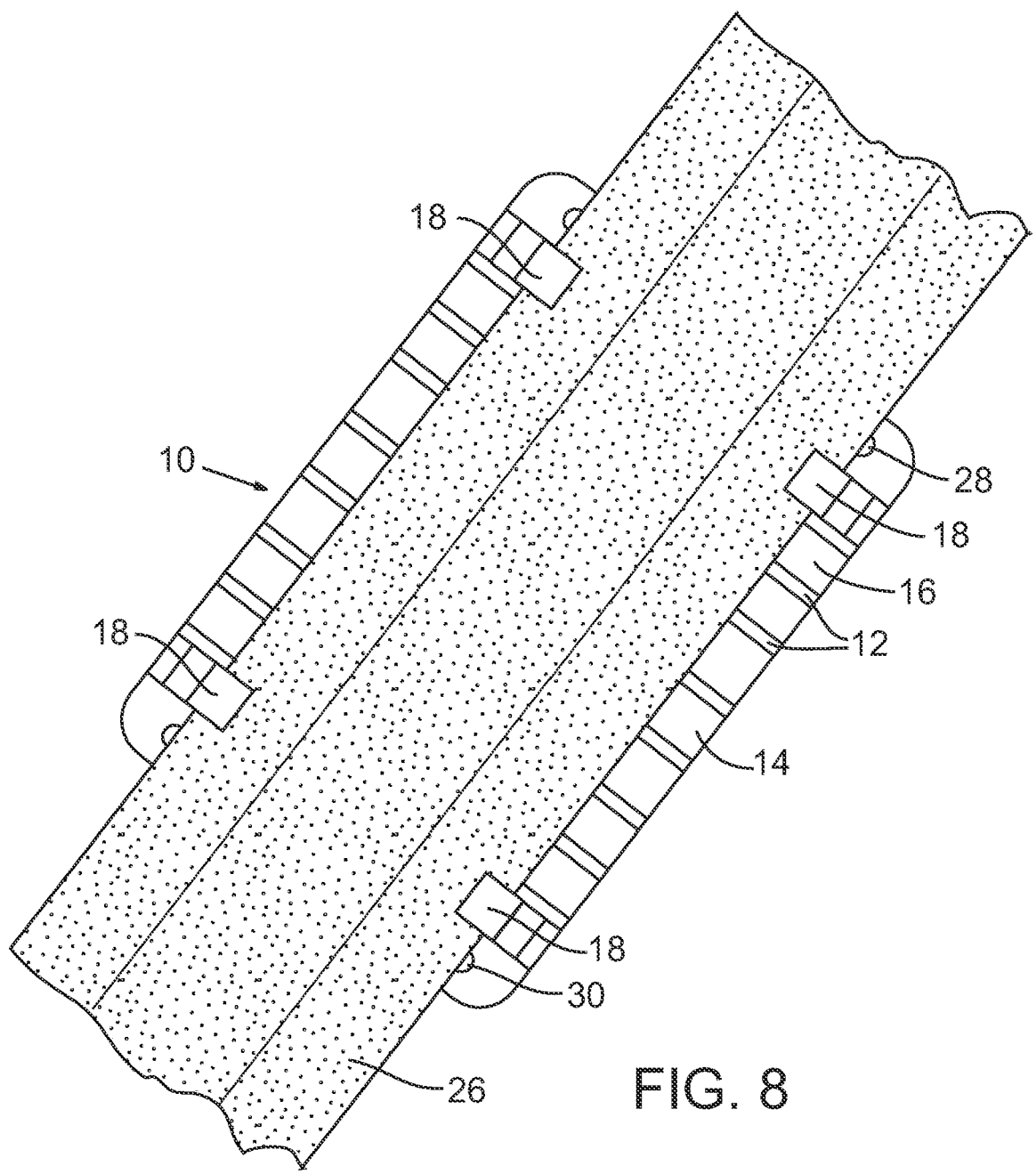
FIG. 8 is a plan view of a cargo guard in accordance with embodiments of the present invention.

In one embodiment, pad 10 may include opposing retainers such as raised ears 18 that may be raised from the top surface of the pad 10 as best seen in FIG. 2. The retainers may include raised ears 18, clips, tabs, or any other kinds of retainers that are capable of clipping the pad 10 to a binding strap. The opposing raised ears 18 may be configured to have openings 22 facing each other, with the raised ears 18 spaced apart as indicated by reference 24 to accommodate strap 26 of a certain thickness and width. In practice, the strap 26 can be squeezed together or otherwise manipulated to allow for insertion of the strap 26 under the raised ears 18, such that the strap 26 is otherwise in overlying relation to the pad 10, and generally slidably coupled there to. The raised ears 18 may include a portion parallel to the top surface of the pad 10 to clip the strap 26 underneath. In one embodiment, raised ears 18 may be spaced to generally accommodate a four inch strap, though in other embodiments, raised ears 18 may be spaced to accommodate other widths, such as two inches. FIG. 8 illustrates a cargo guard in accordance with an embodiment of the present invention, which has a pad 10 coupled to the strap 26. In various embodiments, other retainer configurations such as raised ears 18, clips, or tabs may be used to couple the strap 26 to the pad 10.

In one embodiment, the opposing ends of the pad 10 may be configured to enable generally overlapping end to end coupling of multiple ones of the pads 10. As best shown in FIG. 3, a first end may include with fasteners 28 and the other end with fastener receivers 30. With reference to FIGS. 4 and 5 it will be seen that the fastener 28 carrying end of one pad 10₁ can be coupled to the fastener receivers 30 of another pad 10₂. In various embodiments, multiple pads 10 may be daisy chained together in order to protect a larger surface, for example.

With reference back to FIG. 1, in one embodiment, the pad 10 may have a strap receiving apertures or end slots 32 that are adapted to engage a strap 26 of a certain width and thickness. End slots 32 may be used on the pad 10 that includes raised ears 18, or on a pad (not shown) that does not include such raised ears 18. In one embodiment, assuming the raised ears 18 are adapted to accommodate a strap 26 having a four inch width, should a strap 26 of different width be used e.g. a two inch strap-width, the slot 32 may be configured to accommodate such smaller width strap 26. Such may however require that the strap 26 be threaded through the slots 32.

In one embodiment, as illustrated in FIGS. 7A-7C, slots 32' may be included in the end region of the pad 10. Slots 32' may have openings 34 defining ear portions 36, which may allow the insertion of the strap 26 by squeezing the sides to the opening width and thus avoiding having to thread the pad 10 onto the strap 26. As with raised ears 18, this allows for quick and strategic placement of the pad 10 between the strap 26 and the cargo item. In one embodiment, the smaller width strap retainers may be raised ears, similar to the raised ears 18.

FIG. 6 illustrates how multiple ones of the pads 10 can be stacked together to facilitate storage. In one embodiment, by virtue of the contours of the pad 10, multiple pads 10 may be stacked in a nesting arrangement, where the raised ears 18 of one pad 10 nest in apertures 19 of the second pad 10 of which portion is removed due to the raised ears 18 of the second pad 10. In one embodiment, the aperture 19 may include projected area of the corresponding raised ear 18. In another embodiment, the fasteners 28 and fastener receivers 30 (see e.g. FIG. 2) may be configured to nest and allow stackability of multiple pads 10.

The pads 10 in accordance with embodiments of the present invention may allow for ready placement of the pad 10 in a desired location in order to provide protection for a cargo item to be strap retained in a cargo hold area (e.g. truck box, railroad car, ship hold etc.). In such various embodiments, the user may be able to (a) reel out a securement strap 26, (b) determine the contours of the cargo item that will be engaged, (c) place one or more protect pads 10 at the desired locations and/or (d) couple the pads 10 to the straps 26 (or vice versa) by the procedure described, e.g. squeeze the strap side edges to allow insertion under the raised ears 18. The straps 26 can then be tightened as desired.

In other embodiments, the pads 10 can be provided with slip resistant bottom surfaces to resist sliding of the pads 10 relative to the cargo item and/or the top may be provided with a low friction surface to encourage sliding of the strap 26 relative to the pad 10. In one embodiment, the pad 10 may be provided that includes a plurality of hinges and one or more retainers that are adapted to couple the pad 10 to the strap 26 without the need to thread the strap 26 beginning at one end of the strap 26.

In various embodiments, a mixture of rigid, semi rigid and/or flexible material (such as rubber or other elastomeric material) may be combined to form a cargo guard or a pad 10 in accordance with embodiments of the present invention. In one embodiment, for example, the end portions of the guard or the pad 10 may be made of a semi rigid or rigid material such that it may include retainers such as raised ears 18, clips, and tabs, or slots, and the like that can engage a strap 26, and the middle portion between the end portions may be made of a flexible material (e.g. with or without hinges) that may be adapted to conform to a geometric configuration. In another embodiment, for example, a middle portion of the guard may be made of a semi rigid or rigid material having strap retainers, and the outer portions may be made of a flexible material. In further embodiments, a rigid or semi rigid material may be formed over the top of a flexible material.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A cargo protector comprising:

two or more generally parallel first segments;

one or more second segments generally parallel to the two or more first segments, and arranged with a second segment parallel to and disposed between adjacent ones of said first segments, the one or more second segments configured to allow a respective rotation of said adjacent first segments with respect to each other;

one or more bend segments parallel to the two or more first segments;

wherein a respective rotation of the first segments allowed by the one or more bend segments is greater than the rotation of the first segments allowed by the each of the one or more second segments; and further including a retainer configured to couple to a generally flat strap without having to thread an end of the strap through the retainer.

2. A cargo protector comprising:

two or more generally parallel first segments;

one or more second segments generally parallel to the two or more first segments and arranged with a second segment parallel to and disposed between adjacent ones of said first segments, the one or more second segments configured to allow a respective rotation of said adjacent first segments with respect to each other;

a retainer configured to couple to a generally flat strap without having to thread an end of the strap through the retainer; and one or more fasteners and one or more fastener receivers, the fasteners and fastener receivers being disposed such that the cargo protector may be coupled to at least one other cargo protector.

* * * * *